(12) United States Patent
Underwood (10) Patent No.: US 9,088,441 B2
(45) Date of Patent: *Jul. 21, 2015

(54) METHOD AND SYSTEM FOR MONITORING AND ANALYZING OF IP NETWORKS ELEMENTS

(75) Inventor: Gerald E. Underwood, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/114,572

(22) Filed: May 24, 2011

(65) Prior Publication Data

US 2011/0225295 A1 Sep. 15, 2011

Related U.S. Application Data

(63) Continuation of application No. 11/964,616, filed on Dec. 26, 2007, now Pat. No. 7,975,045.

(51) Int. Cl.
*G06F 15/173* (2006.01)
*H04L 12/66* (2006.01)
*H04L 12/26* (2006.01)
*H04L 12/24* (2006.01)

(52) U.S. Cl.
CPC ............ *H04L 12/66* (2013.01); *H04L 41/0213* (2013.01); *H04L 43/06* (2013.01); *H04L 43/18* (2013.01); *H04L 43/08* (2013.01)

(58) Field of Classification Search
CPC ..... H04L 12/66; H04L 41/0213; H04L 43/18; H04L 43/00; H04L 43/02; H04L 43/06; H04L 43/04; H04L 43/08

USPC .................................. 709/223, 224, 225, 226
See application file for complete search history.

(56) References Cited

U.S. PATENT DOCUMENTS

| | | | | |
|---|---|---|---|---|
| 5,878,215 | A * | 3/1999 | Kling et al. | 709/207 |
| 6,570,867 | B1 * | 5/2003 | Robinson et al. | 370/351 |
| 6,615,166 | B1 * | 9/2003 | Guheen et al. | 703/27 |
| 7,702,806 | B2 * | 4/2010 | Gil et al. | 709/234 |
| 7,711,751 | B2 * | 5/2010 | Kelley et al. | 707/791 |
| 7,975,045 | B2 * | 7/2011 | Underwood | 709/224 |
| 8,069,250 | B2 * | 11/2011 | Panjwani et al. | 709/227 |
| 2003/0126254 | A1 * | 7/2003 | Cruickshank et al. | 709/224 |
| 2003/0126255 | A1 * | 7/2003 | Rice et al. | 709/224 |
| 2003/0134320 | A1 * | 7/2003 | Barrus et al. | 435/6 |
| 2003/0185226 | A1 * | 10/2003 | Tang et al. | 370/428 |
| 2004/0196843 | A1 * | 10/2004 | Zinin | 370/389 |
| 2005/0198269 | A1 * | 9/2005 | Champagne et al. | 709/224 |
| 2007/0174732 | A1 * | 7/2007 | Irby et al. | 714/47 |
| 2008/0120153 | A1 * | 5/2008 | Nonemacher et al. | 705/7 |
| 2010/0185416 | A1 * | 7/2010 | Furem et al. | 702/184 |

\* cited by examiner

*Primary Examiner* — Dhairya A Patel (57) ABSTRACT

Exemplary embodiments include methods and systems for monitoring, analyzing, and troubleshooting of control plane dynamics of a network including collecting state data from the one or more routers of one or more protocols at discrete time intervals, the state data being associated with one or more routers of a network, analyzing corresponding state data collected at two or more discrete time intervals, and outputting a result of the analysis of the state data collected from the one or more routers of the network.

20 Claims, 4 Drawing Sheets

METHOD AND SYSTEM FOR MONITORING AND ANALYZING OF IP NETWORKS ELEMENTS

CROSS-REFERENCE TO RELATED APPLICATIONS

This patent application is a continuation of U.S. patent application Ser. No. 11/964,616, filed Dec. 26, 2007, now U.S. Pat. No. 7,975,045 entitled "Method and System for Monitoring and Analyzing of IP Networks Elements" to Gerald E. Underwood, which is hereby incorporated by reference herein in its entirety.

BACKGROUND

Monitoring and/or troubleshooting network elements are a growing concern for Internet Service Providers (ISPs) as the Internet and use of the Internet continues to grow. Routing of data may be controlled by routing protocols. Open Shortest Path First (OSPF) is a hierarchical interior gateway protocol (IGP) for routing in Internet Protocol, using a link-state in the individual areas that make up the hierarchy. Label Distribution Protocol (LDP) is a protocol in which two label switch routers (LSR) exchange label mapping information (e.g., traffic information for multiprotocol label switching (MPLS) network). Protocol-Independent Multicast (PIM) is a family of multicast routing protocols that can provide one-to-many distribution of data over the Internet. Internal Border Independent Protocol (iBGP) is the core routing protocol of the Internet and works by maintaining a table of IP networks or prefixes which designate network reachability among autonomous network systems. Reducing downtime or avoiding problems associated with routing and/or network elements are an increasing concern to the Internet Service Providers (ISPs). Conventional troubleshooting of network elements typically requires a user to manually access each network element to collect information associated with the network element, thus this process may be tedious and time consuming. Also, conventional troubleshooting of network elements may require a manual analysis of the collected information in order to identify one or more problems associated with the network elements. Another conventional troubleshooting of network elements may rely on the network elements to alert a network manager of one or more problems. Often times the network manager may miss an alert.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments of the present disclosure may include collecting backbone router data and/or other network element data, storing the data, and analyzing the data. For example, the backbone routers may be routers located in the backbone area of the network while other areas of the network are connected to it. The backbone routers may perform inter-area routing of the network element data. The data may be automatically displayed to a user via a user interface. Also, the data may be displayed to a user via the user interface in response to commands received via the user interface. The displayed data may assist the user in real-time troubleshooting and/or post-event forensic analysis. Moreover, reports may be generated for various reasons to inform a user of conditions in one or more network elements. Furthermore, an alert may be generated to provide warning of abnormal activity and/or instability in the one or more network elements.

The description below describes servers, computers, terminals, client devices, and other computing devices that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

Figure 1:
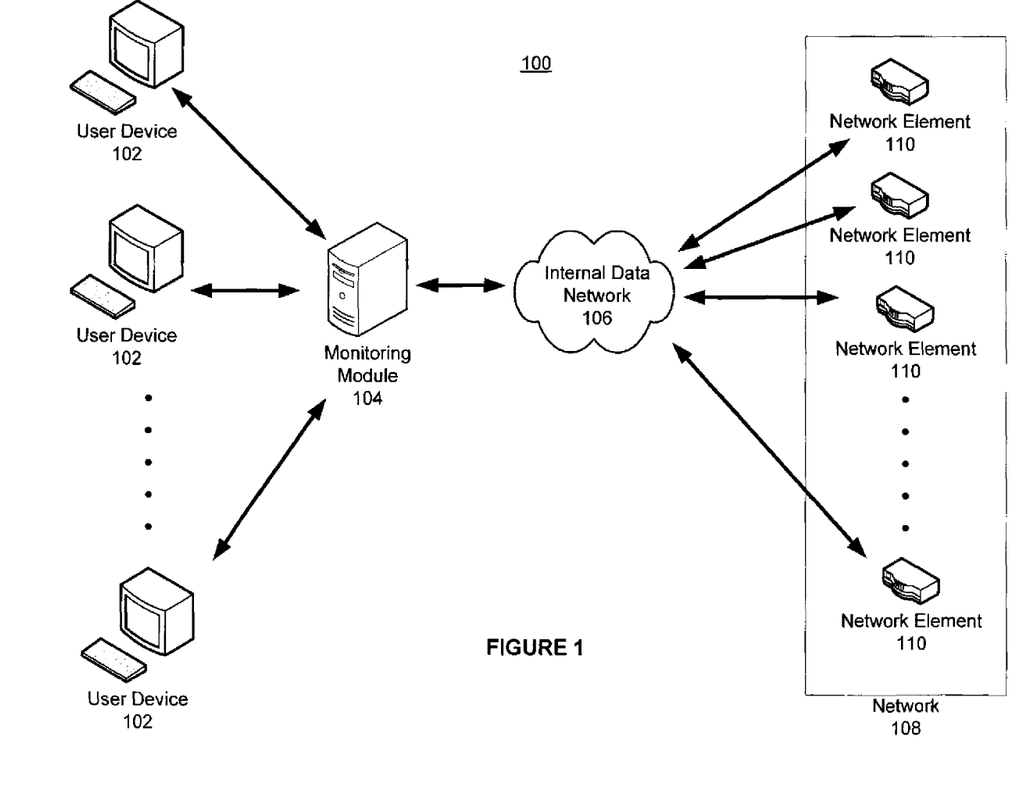
FIG. 1 is a high level schematic of a system that may provide monitoring, analyzing, and troubleshooting of one or more network elements in accordance with an exemplary embodiment.

FIG. 1 illustrates an exemplary system 100 for monitoring, analyzing, and troubleshooting of one or more network elements in accordance with an exemplary embodiment. The system 100 may monitor one or more network elements located in a control plane (e.g., a portion of the router architecture that may be associated with configuring a network map and/or information in a routing table) of the network. Also, the system 100 may monitor the control dynamics of the one or more network elements based at least in part on one or more protocols. Protocols that may be monitored may include, but are not limited to, internal Border Gateway Protocol (iBGP), Label Distribution Protocol (LDP), Protocol Independent Multicast (PIM), and Open Shortest Path First (OSPF). It is noted that other protocols may be monitored in similar manners.

As illustrated in FIG. 1, system 100 may include one or more user devices 102 which may interact with one or more network elements 110 within a network 108 via a monitoring module 104 and/or an internal data network 106. A user may be associated with, but is not limited to, service providers, enterprises, educational institutions, government agencies, and any individual, group and/or organization running, maintaining and/or monitoring a network. Users within an organization may include, but are not limited to, network architects, network managers, engineers, planners, Network Operations Center (NOC) personnel, marketing, sales engineering, operations personnel, and customer support organizations.

The one or more user devices 102 may be a computer, a personal computer, a laptop, a cellular communication device, a global positioning system (GPS), a workstation, a mobile device, a phone, a handheld PC, a personal digital assistant (PDA), a thin system, a fat system, a network appliance, an Internet browser, a paging, an alert device, a television, an interactive television, a receiver, a tuner, a high definition (HD) television, a HD receiver, a video-on-demand (VOD) system, and/or other any other device that may allow a user to communicate with the monitoring module 104 via one or more networks (not shown) as known in the art.

A user associated with the one or more user devices 102 may interactively browse and/or monitor the one or more network elements 110 to display various information associated with one or more network elements 110 within the network 108 via the one or more user devices 102. The user may monitor one or more interfaces associated with the one or more network elements 110. Also, the user may monitor a correlation between various parameters to highlight the interactions that may occur between the one or more network elements 110 within the network 108, e.g., an Internet Protocol (IP) network, etc. For example, the user may monitor routing protocols, interactions between the network elements 110 and internal Border Gateway Protocol (iBGP), Label Distribution Protocol (LDP), Protocol Independent Multicast (PIM), and Open Shortest Path First (OSPF). Also, the user may monitor interior routing dynamics, e.g., views of individual sub-autonomous-systems and/or individual network element within the network 114. Further, the user may monitor any hidden routing dynamics, complex detailed routing protocols and/or low-level routing protocols associated with the one or more network elements 110.

A monitoring module 104 may be one or more servers. The monitoring module 104 may include a UNIX based servers, Windows 2000 Server, Microsoft IIS server, Apache HTTP server, API server, Java sever, Java Servlet API server, ASP server, PHP server, HTTP server, Mac OS X server, Oracle server, IP server, and/or other independent server to monitor one or more network elements 110.

The internal data network 106 may be coupled to the network 108 via a management Ethernet port (not shown). The internal data network 106 and/or the network 108 may be a wireless network, a wired network or any combination of wireless network and wired network. For example, the internal data network 106 and/or the network 108 may include, without limitation, Internet network, satellite network (e.g., operating in Band C, Band Ku and/or Band Ka), wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other wireless network for transmitting a signal. In addition, the internal data network 106 and/or the network 108 may include, without limitation, telephone line, fiber optics, IEEE Ethernet 802.3, wide area network (WAN), local area network (LAN), global network such as the Internet. Also, the internal data network 106 and/or the network 108 may enable, an Internet network, a wireless communication network, a cellular network, an Intranet, or the like, or any combination thereof. The internal data network 106 and/or the network 108 may further include one, or any number of the exemplary types of networks mentioned above operating as a stand-alone network or in cooperation with each other.

Network 108 may include one or more network elements 110. The one or more network elements 110 may be a router, switches, relays, circuit boards and/or other telecommunication equipment that may provide support or services to a user.

Figure 2:
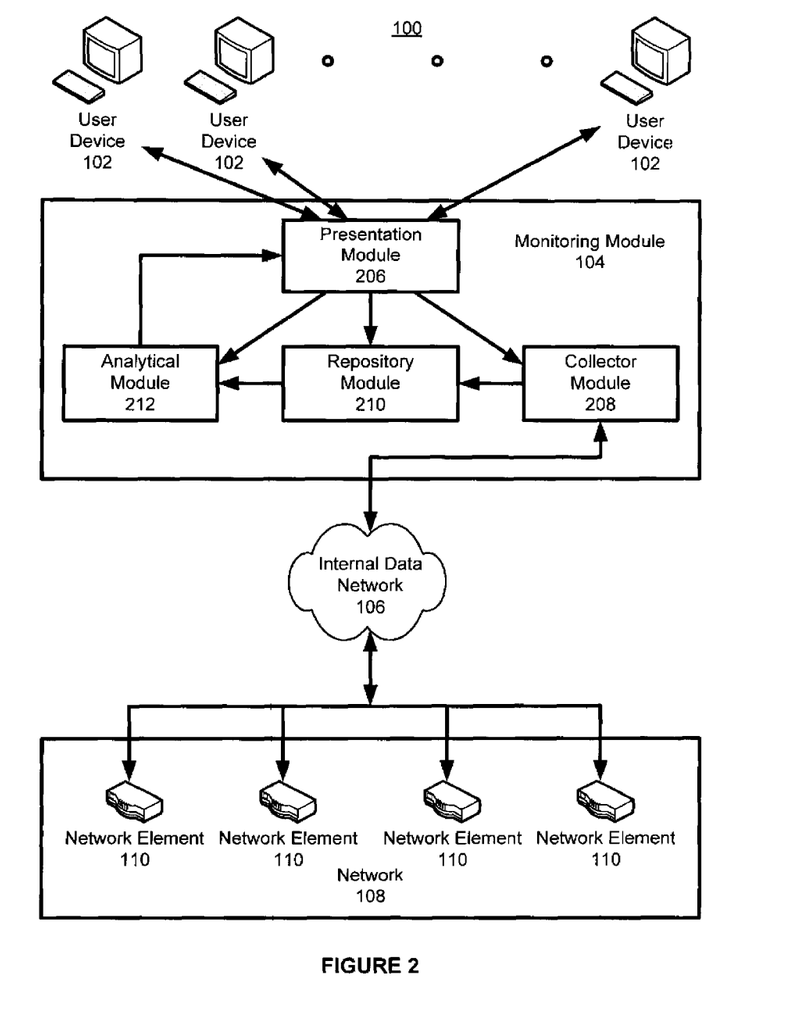
FIG. 2 is a detailed schematic of a system that may provide monitoring, analyzing, and troubleshooting of one or more network elements in accordance with an exemplary embodiment.

FIG. 2 illustrates a detailed exemplary system 100 for monitoring, analyzing, and troubleshooting of one or more network elements in accordance with an exemplary embodiment. As shown in FIG. 2, the monitoring module 104 may include a collector module 208 which may collect data from the one or more network elements 110 in the network 108 via the internal data network 106. The collector module 208 may preprocess the data collected from the one or more network elements 110 in the network 108, e.g., filter, format, aggregate, etc. The preprocessing of the data provided by the collector module 208 may include filtering data and eliminate undesired data, formatting data into useful format, and/or data aggregation where data is gathered and expressed in a summary form. The data may be transferred from the collector module 208 to a repository module 210. The repository module 210 may store and/or manage the data transferred from the collector module 208. An analytic module 212 may access the repository module 210 to obtain the data needed to perform one or more analyses, e.g., predetermined analysis. Finally, the data and/or result of the one or more analyses may be transferred to a presentation module 206 and presented to a user via the one or more user devices 102 at a predetermined period of time. Also, the data and/or the result of the one or more analyses may be automatically and/or upon a request by a user, transferred to a presentation module 206 and presented to a user via one or more user devices 102. A presentation module 206 may provide an interface between one or more user devices 102 and the monitoring module 104. The presentation module 206 may include a user interface, e.g., a graphical user interface, to receive requests from the user and to provide information and/or data to the user via the one or more user devices 102. The presentation module 206 may provide a separate and/or a unified graphical user interface where the presentation module 206 may provide a user with a separate and/or a unified view of one or more protocols e.g., separate and/or unified view of internal Border Gateway Protocol (iBGP), Label Distribution Protocol (LDP), Protocol Independent Multicast (PIM), and Open Shortest Path First (OSPF). Also, a user may monitor various interfaces associated with the one or more network elements 110 without manually accessing each interface associated with the one or more network elements 110. Thus, a user may monitor various protocols and/or interfaces associated with the one or more network elements 110 without manually converting various protocols separately and/or into a unified form.

In addition, the presentation module 206 may include an Application Programming Interface (API) to interact with the one or more user devices 102. In response to receiving a request from a user via the one or more user devices 102, the presentation module 206 may send requests (or control signals, etc.) to the collector module 208, the repository module 210, and the analytical module 212. In response to a request, the analytical module 212 may (a) receive data from repository module 210 and/or collector module 208, (b) analyze the data, and (c) provide data and/or analysis result to the presentation module 206. The presentation module 206 may provide the data and/or analysis results to one or more user devices 102 for display. As a result, system 100 may allow a user to monitor the network 108 in real-time and/or near real-time.

Moreover, the presentation module 206 may include a report generator module (not shown) for generating reports. A report may be automatically generated in the event of a catastrophic network overload, network outage, router failure, network instability and/or a scheduled event. For example, a user may schedule the monitoring system 104 to generate a report of the one or more network elements 110 during a network maintenance and/or a network upgrade. Also, a report may be generated periodically, e.g., hourly, daily, weekly, monthly, yearly, etc, and may include date, time, various parameters and/or analysis in accordance to a user's request. Further, a report may be generated automatically when a user is logged into system 100 in order to update the user of operation and/or instability within the network 108 since the last time the user was logged into system 100. For example, an outage in the one or more network elements 110 in the network 108 may occur during the previous day, a report may be generated automatically and/or upon a request by a user which may include, date, time, data and/or analysis associated with the outage in the one or more network elements 110 in the network 108. Thus, a user may be informed of concerns, problems, and/or repairs that may be needed for the one or more network elements 110 in the network 108.

Furthermore, the presentation module 206 may include an alert dispatcher module (not shown) for alerting one or more users in response to user-specified conditions. For example, a user may define a set of rules and/or conditions upon the occurrence of such rules and/or conditions, a report may be generated to alert the one or more users. Such a report may include date, time, one or more set of rules and/or conditions defined by a user, an analysis of data collected from the one or more network elements 110 in the network 108, and/or status of various network elements 110. A user may be alerted in cases of instability in the operation of a network, failure of network element, network outage, achieving a predetermined threshold or value, one or more threshold-crossing events, data corruption, error in transferring data and/or other parameters requested by the user. For example, a user may monitor a variety of protocols which may include, but not limited to, internal Border Gateway Protocol (iBGP), Label Distribution Protocol (LDP), Protocol Independent Multicast (PIM), and Open Shortest Path First (OSPF) and/or other protocols associated with the one or more network elements 110 in the network 108. Also, a user may monitor various interfaces which may include, but not limited to, outbound interfaces, local interfaces, logical interfaces, inbound interfaces, service interfaces, client interfaces and/or other interfaces associated with the one or more network elements 110 in the network 108. The dispatched alert can take various forms including, but not limited to, email, telephone call, paging alert.

The collector module 208 may interact with the one or more network elements 110 in the network 108. Through these interactions, the dynamics of the one or more interfaces associated with the one or more network elements 110 may be captured. For example, the collector module 208 may sequentially and/or simultaneously collect data from the one or more network elements 110. The collector module 208 may use one or more methods to access the one or more network elements 110 via the internal data network 106. For example, the collector modules 208 may access the one or more network elements 110 via telecommunication network (TELNET), command line interface (CLI), secure socket header (SSH), simple network management protocol (SNMP), File Transfer Protocol (FTP), Secure Shell (SSH), and/or other methods access and/or collecting data from the one or more network elements 110. The collector module 208 may provide the data from each of the one or more network elements 110 to the repository module 210. This data may include, but is not limited to, an up/down state associated with the one or more network elements 110, protocols, interfaces, routing table size, route updates, and event logs. The collector module 208 may preprocess the data collected from the one or more network elements 110 before transferring the data to the repository module 210.

The repository module 210 may store and manage data from the collector module 208. The repository module 210 may provide an interface, e.g., a uniform interface, for other modules within the system 100 and may write, read, and search data in one or more repositories or databases. The repository module 210 may also perform other functions, such as, but not limited to, concurrent access, backup and archive functions. Also, due to limited amount of storing space the repository module 210 may compress, store, transfer and/or discard the data stored within after a period of time, e.g., a month. The repository module 210 may provide data to the analytical module 212.

The analytical module 212 may retrieve data from the repository module 210 and analyze such data. The analytical module 212 may further include a plurality of sub-analytical modules to perform various types of data analysis. The analytical module 212 may perform various analyses, such as, but not limited to, time series analysis, forensic analysis, and/or pattern matching analysis. For example, using the one or more user devices 102, a user may select various types of data analyses to be performed. A user may select a time series data analysis where data collected at an earlier time may be compared with the current data. Also, a user may select forensic data analysis where a user may select to analyze the data collected in the past. Further, a user may select pattern matching analysis where patterns associated with the data collected in the past may be matched with the current data. The analytic module 212 may summarize and aggregate data retrieved from the repository module 210 to provide a complete report of the routing dynamics protocol and/or one or more interfaces from the one or more interfaces associated with the one or more network elements 110.

Figure 3:
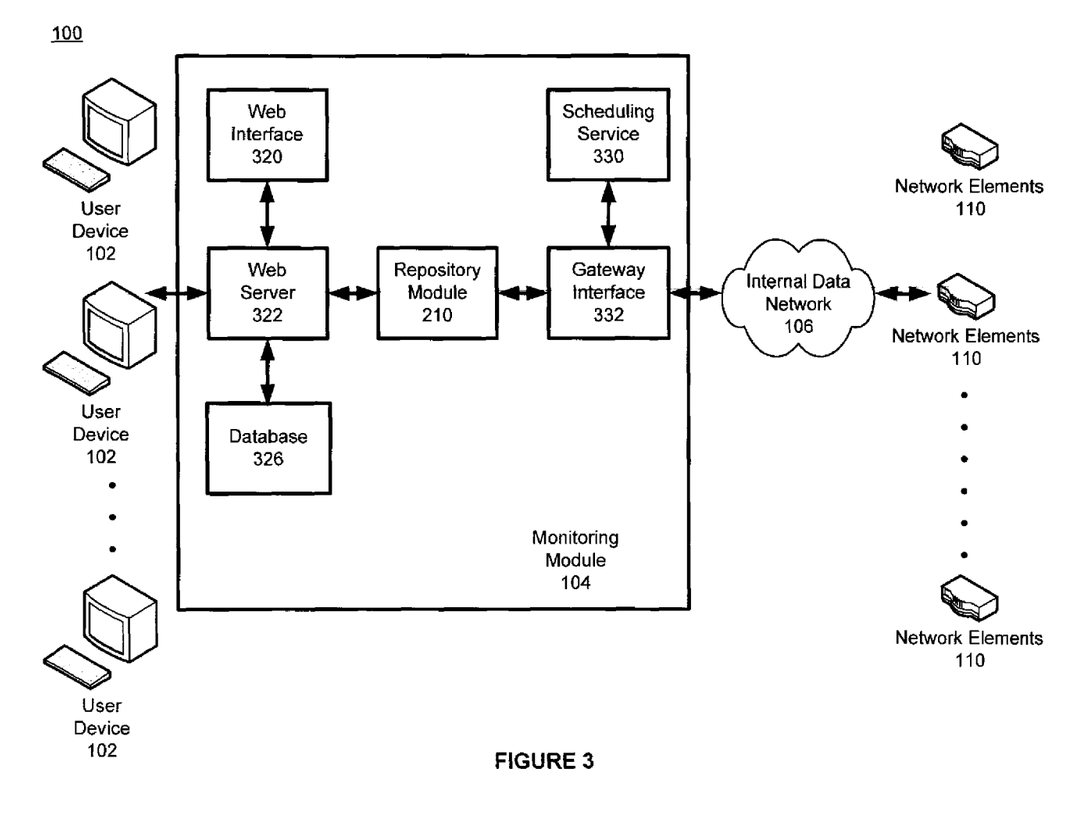
FIG. 3 is another detailed schematic of a system that may provide monitoring, analyzing, and troubleshooting of one or more network elements in accordance with an exemplary embodiment.

Referring to FIG. 3, a detailed schematic of a system that may provide monitoring, analyzing, and troubleshooting of one or more network elements in accordance with an exemplary embodiment is illustrated. FIG. 3 is a more detailed view of monitoring module 104 compared to FIGS. 1 and 2. As shown, the presentation module 206 may include a web interface 320, a web server 322, and a database 326.

The web interface 320 may include software code for interfacing with one or more user devices 102. For example, the software code may be source code written in HTML (Hyper-Text Markup Language) and/or PHP (Hypertext Preprocessor). The software code may drive the web server 322 to provide and receive information to and from the user via one or more user devices 102. The web interface 320 may access data, such as system configuration and user authentication data from the database 326 via the web server 322. The web interface 320 may access routing data from the repository module 210 via the web server 322. The web interface 320 may also be part of the analytical module 212 and perform analysis of the data in the repository module 210. The web server 322 may be a PHP-enabled Apache server. The web server 322 may interact with one or more user devices 102 via one or more networks as known in the art.

The repository module 210 may route the data files between the gateway interface 332 of the collector module 108 and the web server 322 of the presentation module 206. Software code may be associated with the gateway interface 332 which may include, but not limited to, Perl and Expect scripts, for retrieving data and processing data. The software code associated with the gateway interface 332 may access the one or more network elements 110 via the internal data network 106 to retrieve one or more interfaces/protocols data and may store the data as interfaces/protocols data files which are provided to the repository module 210. Also, the software code associated with the gateway interface 332 may be configured to filter, format, and aggregate the data prior to storing the interface/protocol data files. For example, using Expect scripts, the gateway interface 332 lean retrieve interface/protocol data through interactive applications such as telecommunication network (TELNET), command line interface (CLI), secure socket header (SSH), simple network management protocol (SNMP), File Transfer Protocol (FTP), Secure Shell (SSH), etc. A scheduling service 330 may trigger the gateway interface 332 to obtain interface/protocol data from the one or more network elements 110, e.g., routers, at specific times, e.g., hourly or daily. The scheduling service 330 and/or the gateway interface 332 may form the collector module 208.

Figure 4:
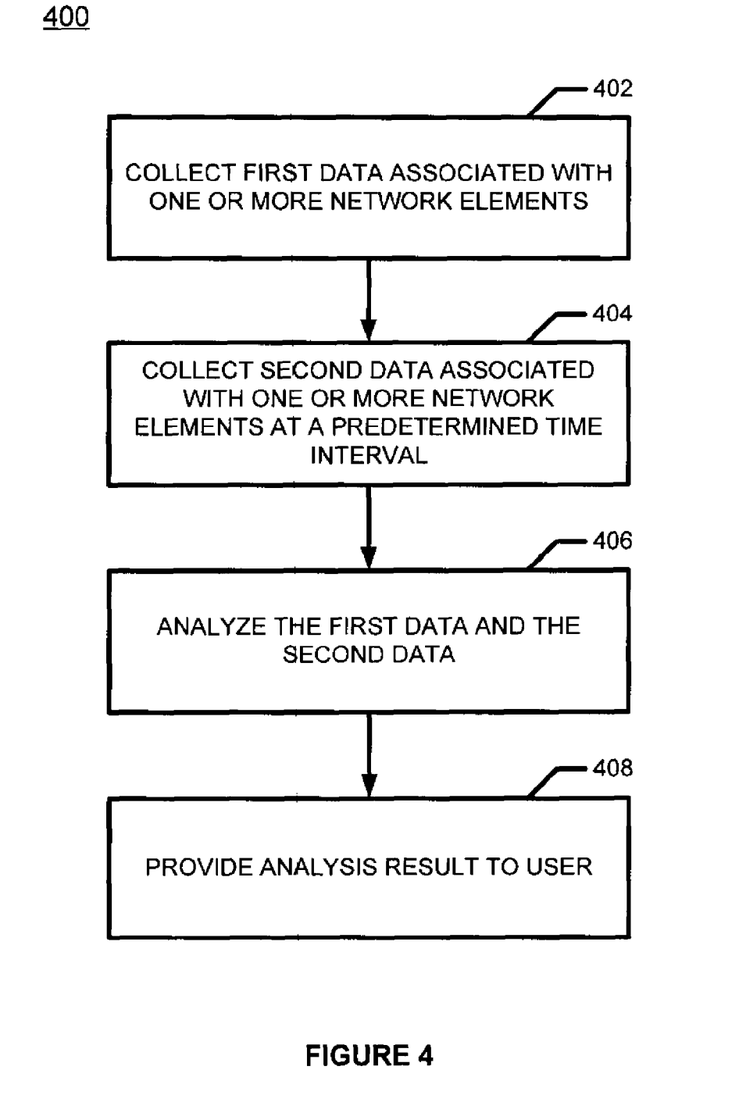
FIG. 4 is a flow diagram of a method for monitoring, analyzing, and troubleshooting of one or more network elements in accordance with an exemplary embodiment.

FIG. 4 illustrates a flow diagram of a method for monitoring, analysis, and troubleshooting of one or more network elements in accordance with exemplary embodiments. This exemplary method 400 is provided by way of example, as there are a variety of ways to carry out methods according to the present disclosure. The method 400 shown in FIG. 4 can be executed or otherwise performed by one or a combination of various systems. The method 400 described below may be carried out by system 100 shown in FIGS. 1, 2 and 3 by way of example, and various elements of the system 100 are referenced in explaining the example method of FIG. 4. Each block shown in FIG. 4 represents one or more processes, methods or subroutines carried in exemplary method 400. Referring to FIG. 4, exemplary method 400 may begin at block 402.

At block 402, a collector 208 may collect first data associated with one or more network elements 110. The collector module 208 may access the one or more network elements 110 by transmitting one or more access request signals over an internal data network 106. The collector module 208 may use various methods to access the one or more network elements 110. For example, various access methods may include telecommunication network (TELNET), command line interface (CLI), secure socket header (SSH), simple network management protocol (SNMP), File Transfer Protocol (FTP), Secure Shell (SSH), etc. The collector module 208 may collect data associated with one or more protocols associated with the one or more network elements 110. For example, the one or more protocols may include, but are not limited to, internal Border Gateway Protocol (iBGP), Label Distribution Protocol (LDP), Protocol Independent Multicast (PIM), and Open Shortest Path First (OSPF). Also, the collector module 208 may collect data associated with one or more interfaces associated with the one or more network elements 110. For example, the one or more interface may be a connection between a service provider and one or more clients. Thereafter, the collector module 208 may transfer the collected data associated with the one or more network elements 110 to a repository module 210. The repository module 110 may also perform other functions, such as, but not limited to, concurrent access, backup and archive functions. After the collector module 208 may collect data associated with one or more network elements 110, the method 400 may proceed to block 404.

At block 404, the collector module 208 may collect second data from the one or more network elements 110 at a predetermined time interval, e.g., every second, every minute, every hour, etc. The first and/or second data collected from the one or more network elements 110 by the collector module 208 may be an up state or a down state associated with the one or more network elements 110. For example, the up state may represent the one or more network elements 110 are functioning properly wherein one or more protocols and/or one or more interfaces associated with the one or more network elements 110 are functioning properly. The down state may represent a failure of the one or more network elements 110 wherein the one or more protocols and/or the one or more interfaces associated with the one or more network elements 110 are not functioning properly. The second data collected at the predetermined interval by the collector module 208 may transfer to a repository module 210 to be processed include filtering, formatting and/or aggregating. After the collector module 208 may collect second data associated with one or more network elements 110 at the predetermined interval, the method 400 may proceed to block 406.

At block 406, an analytical module 212 may analyze the data collected by the collector module 208. The analytical module 212 may retrieve first and/or second data from the repository module 210. For example, the analytical module 212 may retrieve the first data and the second data collected by the collector module 208 from the repository module 210 at two disparate time intervals. The analytical module 212 may compare and/or contrast the first data and the second data. For example, a predetermined number of neighboring open shortest path first (OSPF) may be associated with the one or more network elements 110. Also, a transmission control protocol (TCP) may run between each predetermined number of neighboring open shortest path first (OSPF). The analytical module 212 may detect a down state associated with the one or more of the predetermined number of neighboring open shortest path first (OSPF) from about real-time (e.g., as rapidly as required, actual time) the second data collected by the collector module 208. Thereafter, the analytical module 212 may compare and/or contrast about real-time (e.g., as rapidly as required, actual time) the second data with the first data collected by the collector module 208. For example, the analytical module 212 may determine that the one or more neighboring open shortest path first (OSPF) in the down state in the second data may not be in the down state in the first data. Therefore, the analytical module 212 may send an alert/report to the one or more user devices 102 via a presentation module 206. Also, the analytical module 212 may compare and/or contrast about real-time (e.g., as rapidly as required, actual time) the first and/or the second data with a predetermined threshold value. For example, a user may set the predetermine threshold value based at least in part on network specifications and/or network configurations. The analytical module 212 may determine that one or more of the predetermined number of neighboring open shortest path first (OSPF) may not match the predetermined threshold value. Therefore, the analytical module 212 may send alert/report to the one or more user devices 102 via the presentation module 206. After the analytical module 212 may analyze the data collected by the collector module 208, the method 400 may proceed to block 408.

At block 408, the analysis results are provided to the user. For example, web server 322 provides the analysis results to the one or more user devices 102. Also, the web server 322 may provide the analysis results to the one or more user devices 102 associated with the user who requested the analysis. The web server 122 may cause one or more user devices 102 to display the results of the analysis to the user.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed:

1. A method, comprising:
    collecting first state data of one or more interfaces of a network element at a first predetermined time;
    collecting second state data of the one or more interfaces of the network element at a second predetermined time;
    monitoring the one or more interfaces of the network element without manually accessing each interface associated with the network element;
    analyzing, via an analytical module comprising at least one computer processor, the first state data collected at the first predetermined time and the second state data collected at the second predetermined time, wherein analyzing the first state data collected at the first predetermined time and the second state data collected at the second predetermined time comprises comparing the first state data and the second state data to each other; and
    outputting a report of a result of the analysis of the first state data and the second state data to one or more user devices,
    wherein the network element is a router located in a control plane of a network, and
    wherein the first state data and the second state data are collected to monitor two or more routing protocols selected from the group consisting of internal Border Gateway Protocol (iBGP), Label Distribution Protocol (LDP), Protocol Independent Multicast (PIM), and Open Shortest Path First (OSPF), without having to convert the two or more protocols separately and/or into a unified form.

2. The method of claim 1, further comprising transmitting one or more access request signals to access the network element in order to collect the first state data at the first predetermined time and the second state data at the second predetermined time.

3. The method of claim 1, further comprising alerting a user based at least in part on a determination that the one or more interfaces of the network element are in a down state.

4. The method of claim 1, further comprising performing at least one of filtering, formatting, and aggregating the first state data and the second data of the one or more interfaces collected from the network element.

5. The method of claim 1, wherein analyzing the first state data collected at the first predetermined time and the second state data collected at the second predetermined time further comprises performing at least one of pattern matching analysis, time series analysis, and forensic analysis based at least in part on the first state data collected at the first predetermined time and the second state data collected at the second predetermined time.

6. The method of claim 1, further comprising alerting a user based at least in part on one or more parameters specified by the user.

7. The method of claim 6, wherein the report of the result of the analysis is generated based at least in part on the one or more parameters specified by the user.

8. The method of claim 1, further comprising providing at least one of a separate view and a unified view of the one or more interfaces of the network element.

9. A non-transitory computer readable media comprising code to perform the acts of the method of claim 1.

10. The method of claim 1, wherein analyzing the first state data collected at the first predetermined time and the second state data collected at the second predetermined time further comprises comparing the first state data and the second state data to a predetermined threshold value.

11. A system implemented on a computer comprising:
    one or more processors;
    memory having instructions stored thereon, the instructions, when executed by the one or more processors, cause the processors to perform operations comprising:
        collecting first state data of one or more interfaces of a network element at a first predetermined time and collecting second state data of the one or more interfaces of the network element at a second predetermined time;
        monitoring the one or more interfaces of the network element without manually accessing each interface associated with the network element;
        analyzing the first state data collected at the first predetermined time and the second state data collected at the second predetermined time by comparing the first state data and the second state data to each other; and
        generating a report of a result of the analysis of the first state data and the second state data to one or more user devices,
    wherein the network element is a router located in a control plane of a network, and
    wherein the first state data and the second state data are collected to monitor two or more routing protocols selected from the group consisting of internal Border Gateway Protocol (iBGP), Label Distribution Protocol (LDP), Protocol Independent Multicast (PIM), and Open Shortest Path First (OSPF), without having to convert the two or more protocols separately and/or into a unified form.

12. The computer implemented system of claim 11, wherein the instructions further cause the one or more processors to access the network element via at least of a telecommunication network, secure socket header (SSH), and simple network management protocol (SNMP).

13. The computer implemented system of claim 11, wherein the instructions further cause the one or more processors to perform at least one of filter, format and aggregate the first state data collected at the first predetermined time and the second state data collected at the second predetermined time.

14. The computer implemented system of claim 11, wherein the instructions further cause the one or more processors to perform at least one of pattern matching analysis, time series analysis, and forensic analysis based at least in part on the first state data collected at the first predetermined time and the second state data collected at the second predetermined time.

15. The computer implemented system of claim 11, wherein the instructions further cause the one or more processors to alert a user based at least in part on one or more parameters specified by the user.

16. The computer implemented system of claim 11, wherein in response to determining that the one or more interfaces of the network element are in a down state, the instructions further cause the one or more processors to alert a user.

17. The computer implemented system of claim 11, wherein the instructions further cause the one or more processors to generate the report based at least in part on the analysis of the first state data collected at the first predetermined time and the second state data collected at the second predetermined time.

18. The computer implemented system of claim 11, wherein the instructions further cause the one or more processors to provide at least one of a separate view and a unified view of the one or more interfaces of the network element.

19. The computer implemented system of claim 11, wherein the one or more interfaces comprise at least one of outbound interfaces, local interfaces, logical interfaces, inbound interfaces, service interfaces, and client interfaces.

20. The computer implemented system of claim 11, wherein the one or more user devices are configured to display the report of the result of the analysis.

\* \* \* \* \*